US009830613B2

(12) United States Patent
Palmer et al.

(10) Patent No.: US 9,830,613 B2
(45) Date of Patent: Nov. 28, 2017

(54) SYSTEMS AND METHODS FOR TRACKING VIRALITY OF MEDIA CONTENT

(71) Applicant: Brainfall.com, Inc., San Francisco, CA (US)

(72) Inventors: Joshua Palmer, San Francisco, CA (US); Paul Skowronski, San Francisco, CA (US); Anthony Bui, Brooklyn, NY (US)

(73) Assignee: BRAINFALL.COM, INC., San Francisco, CA (US)

( * ) Notice: Subject to any disclaimer, the term of this patent is extended or adjusted under 35 U.S.C. 154(b) by 233 days.

(21) Appl. No.: 14/711,635

(22) Filed: May 13, 2015

(65) Prior Publication Data

US 2016/0337214 A1  Nov. 17, 2016

(51) Int. Cl.
| | | |
|---|---|---|
| *G06F 15/173* | (2006.01) | |
| *G06Q 30/02* | (2012.01) | |
| *H04L 12/58* | (2006.01) | |
| *G06Q 50/00* | (2012.01) | |

(52) U.S. Cl.
CPC ......... *G06Q 30/0247* (2013.01); *G06Q 50/01* (2013.01); *H04L 51/32* (2013.01)

(58) Field of Classification Search
CPC .................. H04L 51/32; H04N 21/442; H04N 21/44222; H04N 21/6582; G06Q 30/0247; G06Q 50/01
USPC .................. 709/224, 203, 223; 725/9-11, 14
See application file for complete search history.

(56) References Cited

U.S. PATENT DOCUMENTS

| | | | | |
|---|---|---|---|---|
| 8,145,528 | B2 * | 3/2012 | Gilley ................ | G06Q 30/0241 705/14.4 |
| 8,682,809 | B2 * | 3/2014 | Avedissian ....... | H04N 21/44016 705/1.1 |
| 9,276,757 | B1 | 3/2016 | Freund et al. | |
| 2008/0091517 | A1 | 4/2008 | Koonce et al. | |
| 2008/0256233 | A1 | 10/2008 | Hall et al. | |
| 2009/0222796 | A1 | 9/2009 | Keohane et al. | |

(Continued)

OTHER PUBLICATIONS

How to Write Advertisments That Sell, by Factory Magazine, from System, the magazine of Business, dated 1912, downloaded from http://library.duke.edu/digitalcollections/eaa_Q0050/ on Sep. 11, 2015.

(Continued)

*Primary Examiner* — Frantz Jean
(74) *Attorney, Agent, or Firm* — Perkins Coie LLP

(57) ABSTRACT

Various of the disclosed embodiments concern systems and methods for tracking virality and social lift of media content. In some embodiments, an analytics engine creates and tags URLs to media content using generation codes, time codes, or both. The codes and their respective values allow the analytics engine to determine whether trends or patterns exist in how media content is viewed and shared. The generation codes and time codes can be used instead of, or in addition to, conventional UTM codes. The generation code, time code, or both, can be used to determine which segments (e.g., generations, time periods) of viewers generate a profit, subsequent viewers, etc. For example, the analytics engine can determine when an advertising campaign for a piece of media content should be terminated, rather than simply indicating whether the campaign should continue.

19 Claims, 14 Drawing Sheets

(56) References Cited

U.S. PATENT DOCUMENTS

| | | |
|---|---|---|
| 2010/0217720 A1 | 8/2010 | Jones et al. |
| 2010/0318611 A1 | 12/2010 | Curtin et al. |
| 2011/0313996 A1* | 12/2011 | Strauss .............. G06Q 30/0242 |
| | | 707/709 |
| 2012/0109737 A1 | 5/2012 | Setty et al. |
| 2012/0136714 A1* | 5/2012 | Nesamoney ........... G06Q 30/02 |
| | | 705/14.43 |
| 2012/0271719 A1 | 10/2012 | Straley et al. |
| 2012/0290950 A1* | 11/2012 | Rapaport ................ H04L 51/32 |
| | | 715/753 |
| 2013/0013393 A1 | 1/2013 | Koonce et al. |
| 2013/0066711 A1 | 3/2013 | Liyanage et al. |
| 2013/0073568 A1* | 3/2013 | Federov ............ G06F 17/30867 |
| | | 707/749 |
| 2013/0159233 A1 | 6/2013 | Mason et al. |
| 2014/0095412 A1 | 4/2014 | Agashe et al. |
| 2014/0129668 A1 | 5/2014 | Greenzeiger et al. |
| 2014/0304724 A1* | 10/2014 | Shin ..................... H04N 21/442 |
| | | 725/10 |
| 2014/0337120 A1 | 11/2014 | Ercanbrack et al. |
| 2014/0344718 A1* | 11/2014 | Rapaport ................ H04L 51/32 |
| | | 715/753 |
| 2015/0088635 A1 | 3/2015 | Maycotte et al. |
| 2015/0161624 A1 | 6/2015 | Heath et al. |
| 2015/0243279 A1 | 8/2015 | Morse et al. |
| 2015/0245084 A1* | 8/2015 | Downing ........... H04N 21/2668 |
| | | 725/12 |
| 2016/0019033 A1 | 1/2016 | Ebner et al. |

OTHER PUBLICATIONS

Non-Final Office Action Mailed Apr. 14, 2016, in U.S. Appl. No. 14/874,247 of Palmer, J., et al., filed Oct. 2, 2015.

Requirement for Restriction, dated Feb. 5, 2016, in U.S. Appl. No. 14/874,247 of Palmer, J., et al., filed Oct. 2, 2015.

U.S. Appl. No. 14/711,649 by Palmer, J., et al., filed May 13, 2015.

U.S. Appl. No. 14/711,665 by Palmer, J., et al., filed May 13, 2015.

U.S. Appl. No. 14/874,247 by Palmer, J., et al., filed Oct. 2, 2015.

\* cited by examiner

| Content ID = A4CDF6 | | |
|---|---|---|
| Name | Code Value | Viewer Count |
| Generation 0 | utm_user_gen=0 | 2,664 |
| Generation 1 | utm_user_gen=1 | 1,814 |
| Generation 2 | utm_user_gen=2 | 1,498 |

FIG. 2

| Content ID = A4CDF6 | | | |
|---|---|---|---|
| Generation 1 [utm_user_gen=1] | | | |
| Date | Viewer Count | Profit Generated | Viewers Generated |
| 15_03_21 | 2 | $7.63 | 13 |
| 15_03_22 | 2 | $6.72 | 5 |
| 15_03_23 | 4 | $4.03 | 15 |

FIG. 4

| Unique ID | Generation | Code Value | Previous Gen. | Source |
|---|---|---|---|---|
| 1485125 | 1 | user_gen=1 | 1057409 | facebook |
| 1046119 | 2 | user_gen=2 | 1006149 | twitter |
| 1308078 | 6 | user_gen=6 | 1181888 | twitter |
| 1066235 | 8 | user_gen=8 | 1060744 | email |
| 1736940 | 0 | user_gen=0 | 1161616 | ad_paid_1 |
| 1817235 | 3 | user_gen=3 | 1383063 | facebook |
| 1574867 | 4 | user_gen=4 | 1058321 | facebook |
| 1905507 | 0 | user_gen=0 | 1609615 | brainfall |
| 1425438 | 5 | user_gen=5 | 1077298 | twitter |
| 1422451 | 2 | user_gen=2 | 1055264 | facebook |
| 1113345 | 4 | user_gen=4 | 1044287 | twitter |
| 1272041 | 0 | user_gen=0 | 1220665 | ad_paid_2 |
| 1165681 | 1 | user_gen=1 | 1152479 | facebook |
| 1174461 | 7 | user_gen=7 | 1024638 | twitter |
| 1328545 | 7 | user_gen=7 | 1170194 | facebook |

FIG. 5

SYSTEMS AND METHODS FOR TRACKING VIRALITY OF MEDIA CONTENT

FIELD OF THE INVENTION

Various embodiments relate generally to tracking virality of media content. More specifically, various embodiments relate to analytics systems and methods for analyzing sharing habits and viewing patterns of media content.

BACKGROUND

The demand for media content, both interactive and static, that is readily available and easily shareable has increased due to the increased popularity of social media platforms such as Facebook® and Twitter®. A content host (e.g., website owner) can generate and/or store media content, such as stories, videos, and quizzes, that are to be accessed by viewers. In some instances the content host pays for advertisements in an effort to increase viewership of a particular piece of content. For example, the content host might pay a social media/networking platform or a search engine (e.g., Google®) to advertise a quiz using static or dynamic ads, banner ads, text ads, etc. A successful advertising campaign boosts viewership (i.e., increase the number of viewers) for the particular piece of content.

Traditionally, the content provider has been able to track at least some viewer characteristics using Urchin Traffic Monitor (UTM) codes. But UTM codes are limited in their ability to provide granular data from which nuanced viewing and sharing patterns can be discovered. For example, UTM codes are limited in their ability to measure viewer characteristics that can be used to determine success of an advertising campaign, track viewing and sharing measurements that affect virality, and compare the virality of multiple pieces of media content. But this information can affect how decisions are made by content providers, content hosts, sponsors (e.g., of a piece or type of media content), advertisers, etc.

BRIEF DESCRIPTION OF THE DRAWINGS

These and other objects, features, and characteristics will become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

FIG. 2 includes a table that separates viewers of a piece of media content by generation according to various embodiments.

FIG. 4 includes a table that separates viewers of a piece of media content by generation and sharing date as may occur in some embodiments.

FIG. 5 depicts a lookup database that is searchable by unique identifier in accordance with some embodiments.

Figure 1:
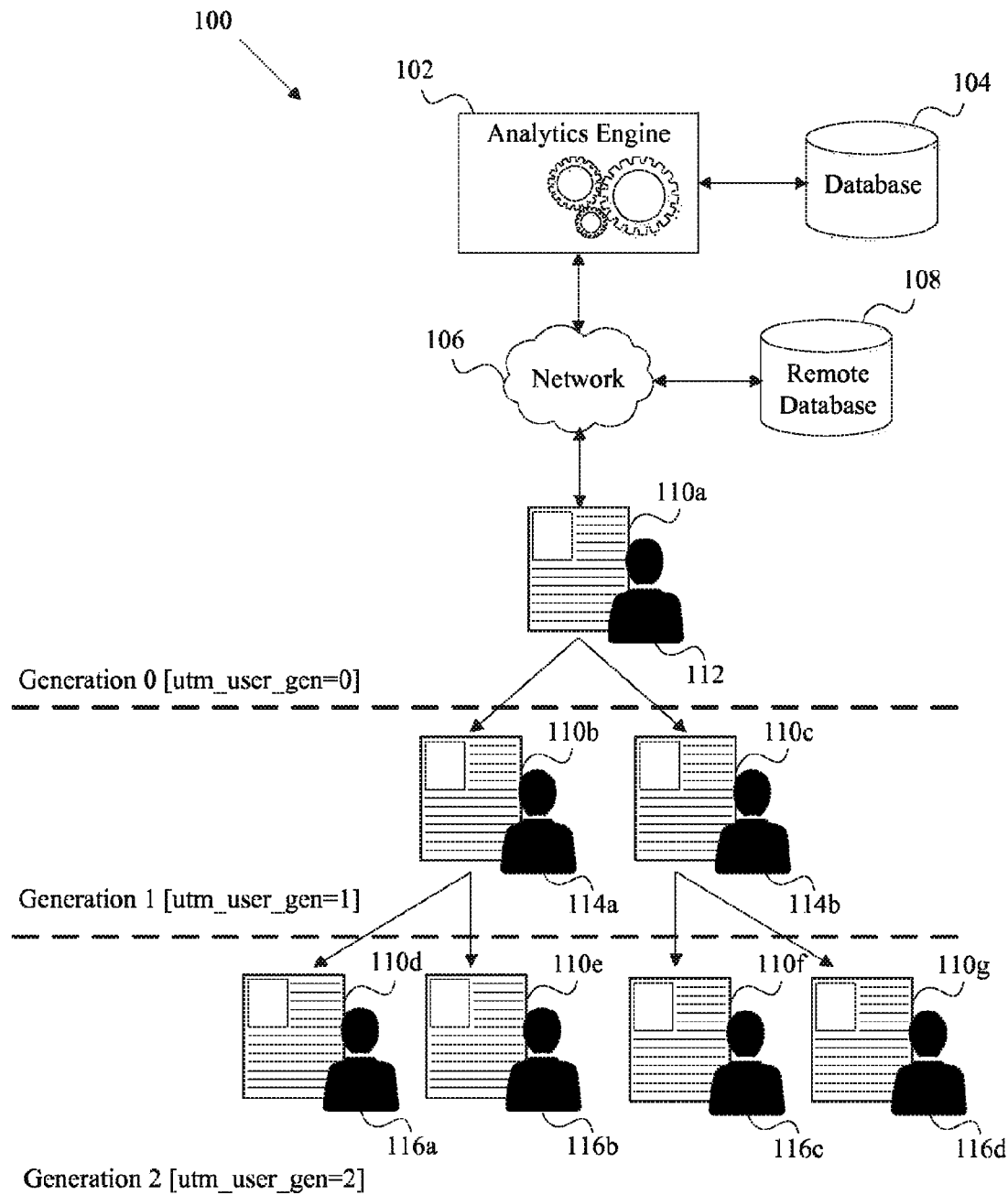
FIG. 1 is a generalized block diagram depicting certain components in a system for tracking virality of media content across generations in accordance with various embodiments.

The figures depict various embodiments described throughout the Detailed Description for purposes of illustration only. While specific embodiments have been shown by way of example in the drawings and are described in detail below, the invention is amenable to various modifications and alternative forms. The intention, however, is not to limit the invention to the particular embodiments described. Accordingly, the claimed subject matter is intended to cover all modifications, equivalents, and alternatives falling within the scope of the invention as defined by the appended claims.

DETAILED DESCRIPTION

Various embodiments are described herein that relate to systems and methods for tracking virality and social lift of media content. More specifically, various embodiments relate to electronic systems and methods for tagging/coding uniform resource locators (URLs) to media content and determining whether patterns exist in how media content is viewed and shared. "Virality" refers to the tendency of a piece of media content (e.g., image, video, story, quiz) to be circulated rapidly and widely from one viewer to another.

As will be described in depth below, media content can be shared by viewers or users that transmit URLs or links targeting a particular URL to one another. Oftentimes, links and URLs are shared through social media platforms, such as Facebook® and Twitter®. Social media platforms allow media content to be quickly circulated to a large group of potential viewers.

In order to track virality, the URLs can include a generation code instead of, or in addition to, conventional Urchin Traffic Monitor (UTM) codes. The generation code can be used to assign a generation value to each viewer of a piece of media content. Some or all of the viewers can then be separated by viewing generation. In some embodiments, the URL includes a time code that can be used by an analytics engine to group viewers based on when the link was shared. For example, a subset of viewers could be separated based on when the link is received (i.e., shared by a Gen_0 viewer). This allows individual viewers to be attributed to a particular day of an advertising campaign or budget.

Tagging URLs with a generation code, a time code, or both, allows the analytics engine to track viral or social lift across multiple generations and/or time period(s). The analytics engine can determine which generations or time periods generate a profit, subsequent viewers, etc. For example, the analytics engine can determine whether an advertising campaign should continue based on the increase or decrease in revenue from more recent viewers.

Traditionally, UTM codes are used to describe attributes of an individual viewer. However, various embodiments described herein permit subsequent viewers to "inherit" certain viewing parameters (e.g., campaign source, date) from previous viewers. Other viewing parameters (e.g., content, term) can continue to be specific to each viewer. Such embodiments allow for more accurate campaign attribution. Because Gen_1, Gen_2, etc., viewers only exist because of an earlier Gen_0 viewer, it is important to track whether the Gen_0 viewer was attracted via an advertising campaign at a particular date/time or no campaign at all.

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or another electronic device) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EEPROMs), magnetic or optical cards, flash memory, or another type of media/machine-readable medium suitable for storing electronic instructions.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

System Topology Overview

FIG. 1 is a generalized block diagram depicting certain components in a system 100 for tracking virality of media content across generations in accordance with various embodiments. An analytics engine 102 can generate or use URLs and/or selectable links to media content. In some embodiments, the media content is stored locally in database 104. In other embodiments, the media content is stored remotely in a database 108 that is communicatively coupled to the analytics engine 102.

The analytics engine 102 can append one or more desired parameters to a URL to a particular piece of media content 110a. The pieces of media content 110a-g depicted by FIG. 1 represent the same piece of media content being viewed by distinct viewers 112, 114a-b, 116a-d. Some or all of these viewers may be categorized in different generations (e.g., viewer 112 in Generation 0, viewers 114a-b in Generation 1). The URL can include a generation code having a generation value of "N," which represents the number of times the particular piece of media content has been shared within a "chain" of viewers. For example, each time a Generation 0 viewer elects to share a URL, a new chain is created. While "N" is generally an integer value, other numbering and naming conventions may be used. The generation value is typically set to an initial value (e.g., zero) before the link or URL is shared. For example, a URL to a piece of media content (e.g., a quiz) may initially be http://www.brainfall.com/quiz/?utm_user_gen=0. Viewers in Generation 0 ("Gen_0") are those viewers that have been gathered organically (e.g., browsed media content) or were targeted directly by the content host, an advertising campaign, etc. That is, viewer 112 may naturally find the media content (e.g., member of organic website traffic), receive the URL directly from the content host (e.g., via email promotion), be the target of an advertising campaign, etc.

A viewer 112 can access the URL or a link targeting the URL over a network 106. The URL and link can be used and hosted by the analytics engine 102 or another computing system. The network 106 can be, for example, the Internet, a local area network, a wide area network, or a point-to-point dial-up connection. As described above, when the analytics engine 102 initially appends a generation code to the URL, the generation value can be set to an initial value (e.g., N=0).

If a Gen_0 viewer 112 subsequently decides to share the URL with others, the generation value of the generation code can be updated (e.g., to "N+1"). For example, the URL to the same piece of media content may be updated to http://www.brainfall.com/quiz/?utm_user_gen=1. Those viewers 114*a-b* that follow the URL or link provided by Gen_0 viewer 112 can be defined as Gen_1 viewers 114*a-b*. Similarly, any viewers who follow a URL or link shared by a Gen_1 viewer 114*a-b* can be defined as Gen_2 viewers 116*a-d*.

FIG. 2 includes a table 200 that separates viewers of a piece of media content by generation according to various embodiments. A system, such as system 100 of FIG. 1, that is capable of generating and/or analyzing URLs that include a generation code can separate viewers of a particular piece of media content 202 by generation value. Table 200 of FIG. 2 illustrates the distribution of viewers across three generations for a piece of media content 202. In some embodiments, the piece of media content 202 is identified by a random unique identifier (ID) or unique name that allows pieces of media content, and their viewers, to be distinguished from one another.

As will be further described below with respect to FIGS. 4-5, the table can include other values, such as generation name 204, generation code/value 206, and total viewer count 208 within each generation. Trends (e.g., increases, decreases) or patterns in the total viewer count 208 can be analyzed by an analytics engine or another computing system to determine virality and track social lift of the piece of media content 202.

Figure 3:
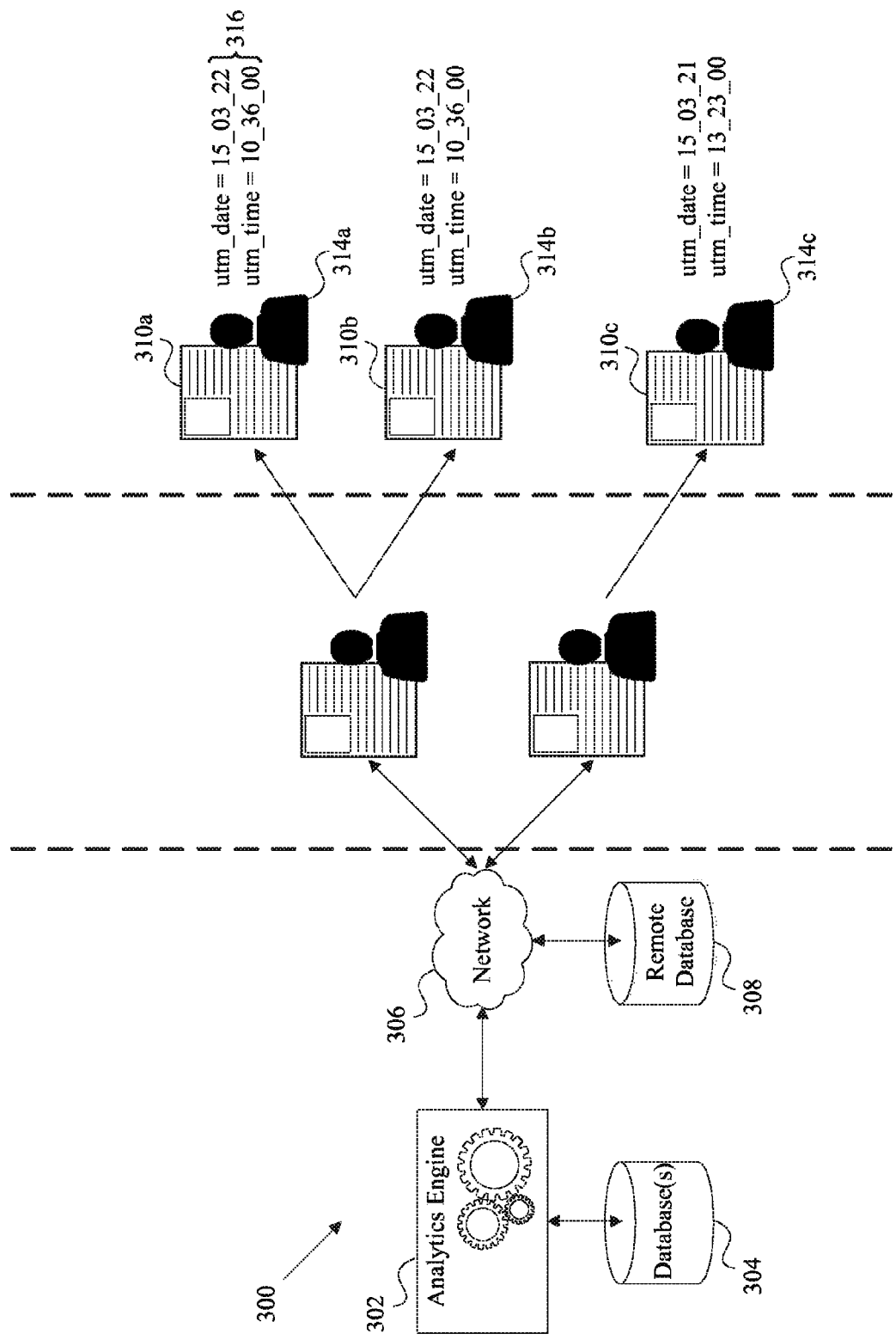
FIG. 3 is a generalized block diagram depicting certain components in a system for tracking virality of media content over time in accordance with various embodiments.

FIG. 3 is a generalized block diagram depicting certain components in a system 300 for tracking virality of media content over time in accordance with various embodiments. An analytics engine 302 can use, append, generate, etc., URLs and/or selectable links to media content. The media content can be stored locally in database 304 or in a remote database 308, which is communicatively coupled to the analytics engine 302 over a network 306. In some embodiments, local database 304 and/or remote database 308 communicate with the analytics engine 302 over a secured network or private network distinct from the public network used to distribute URLs and deliver media content to viewers.

The analytics engine 302 can append desired parameters to a URL to a piece of media content, such as a time code 316 that can be used to categorize viewers based on the time of viewing or sharing. The time code 316 can be configured to include a time value, date value, or both. While FIG. 3 utilizes specific numbering conventions (utm_date=yy_mm_dd, utm_time=hh_mm_ss), other naming and numbering conventions can also be used. For example, a single time code 316 could be used to communicate both date and time.

In some embodiments, the URL also includes a generation code. The time value, in conjunction with a generation value, can be used for ordering or categorizing some or all of the viewers within a generation. For example, an analytics engine 302 can recognize that all Gen_1 viewers 314*a-c* of FIG. 3 received a link to the piece of media content 310*a-c* from a Gen_0 viewer on either March 21 (utm_date=15_03_21) or Mar. 22, 2015 (utm_date=15_03_22). As described above, the time code 316 represents when the viewer's Gen_0 user shared the link.

In some embodiments, the time code 316 is used independently of the generation code. For example, the URL shared with Gen_1 viewer 314*a* may be http://www.brainfall.com/quiz/?utm_date=15_03_21. URLs that include time codes allow a statistical analysis to be performed on groups of viewers who are classifiable by sharing date. In other embodiments, the time code 315 is used in conjunction with a generation code. For example, the URL for Gen_1 viewer 314*a* may be http://www.brainfall.com/quiz/?utm_user_gen=1&utm_date=15_03_21. Further identifying viewers by generation allows for more granular analytics to be applied.

FIG. 4 includes a table 400 that separates viewers of a piece of media content by sharing date as may occur in some embodiments. A system, such as system 300 of FIG. 3, can attribute viewers of a piece of media content to a particular day of an advertising campaign by analyzing when the Gen_0 viewer shared the link with other viewers. For example, table 400 illustrates the distribution of Gen_1 viewers of a piece of media content 402 by sharing date 404. The table 400 can also include viewing date, viewing time, etc., in addition to, or instead of, sharing date 404. That is, some embodiments append codes/parameters that allow the system to track and analyze viewing date, viewing window (e.g., total time spent viewing a piece of media content), etc.

The time code allows the system or an administrator to separate viewers by time value(s) associated with viral events, such as sharing or viewing media content. That is, the time codes and time values allow for more rigorous analytics to be applied. In some embodiments, the system is able to identify viewer count 406 for one or more time periods or date ranges, calculate the profit generated 408 by those viewers, determine how many subsequent viewers (e.g., Gen_2 viewers) were generated by each group, etc. Such measurements can help content providers and content hosts determine what media content to advertise, content popularity, advertising campaign profitability, when to begin or terminate an advertising campaign, etc. The analytics systems described herein can assist an administrator (e.g., content host, advertiser, user) in determining exactly when an advertising campaign should end, rather than simply indicating whether or not the campaign should continue.

In some instances, a more technical system is employed that generates unique IDs for viewers or viewing sessions that are stored in a lookup database. FIG. 5 depicts a lookup database 500 that is searchable by unique ID in accordance with some embodiments. Unique IDs could be generated for individual viewing sessions, rather than for particular viewers. That is, the unique IDs may be completely unrelated to the viewer (e.g., a single viewer who visits a host website multiple times can cause multiple unique IDs to be generated). Tracking individual viewers may be useful in some instances, but undesirable in other instances. The unique ID may also be a Twitter® username, Facebook® username, etc.

In addition to conventional UTM codes that track source, medium, term, content, campaign, etc., the lookup database 500 may also allow viewers to be attributed to specific sources 504 or be traced through previous generations 506 of viewers. This allows the system or administrator to determine which viewers generate profit, are prolific sharers, are more likely to convert a "share" into a viewer, etc. Such viewers can then be specifically targeted by the content host/provider or an advertiser in the future. In some embodiments, the unique IDs are used to generate viral distribution maps that indicate how a piece of media content spread from Gen_0 to future generations.

The lookup database 500 and unique IDs also allow downstream performance to be analyzed. For example, the number of subsequent viewers ("children") originating from a particular viewer ("parent") can be tracked. Consequently, the lookup database 500 can be used to determine whether a viewer is high-value or low-value. In some embodiments, advertisements, content, etc., can be targeted to those users who are considered high-value. The metrics that are collected may be used to algorithmically make real-time updates to advertising campaigns.

The unique IDs can also be used to determine whether a particular viewer should be added to a retargeting list for future advertising campaigns, content, etc. For example, anonymous users (e.g., those within a private network) can be identified and targeted in the following way. A unique ID can be assigned to the anonymous user when accessing the host website. Generally, the unique ID is stored on the network-accessible computing device (e.g., cellular phone, tablet, computer) used to access the website. In some instances the unique ID is stored in a cookie or cookie-like structure. When the anonymous user elects to share a link to the website, the unique ID is included within the shared link(s) as the parent ID. Whenever the anonymous user ("parent") returns to the website, downstream performance can be checked by determining how many "children" users were generated. If the parent ID performed well (e.g., generated a large number of children), it can be added to a retargeting group.

Figure 6:
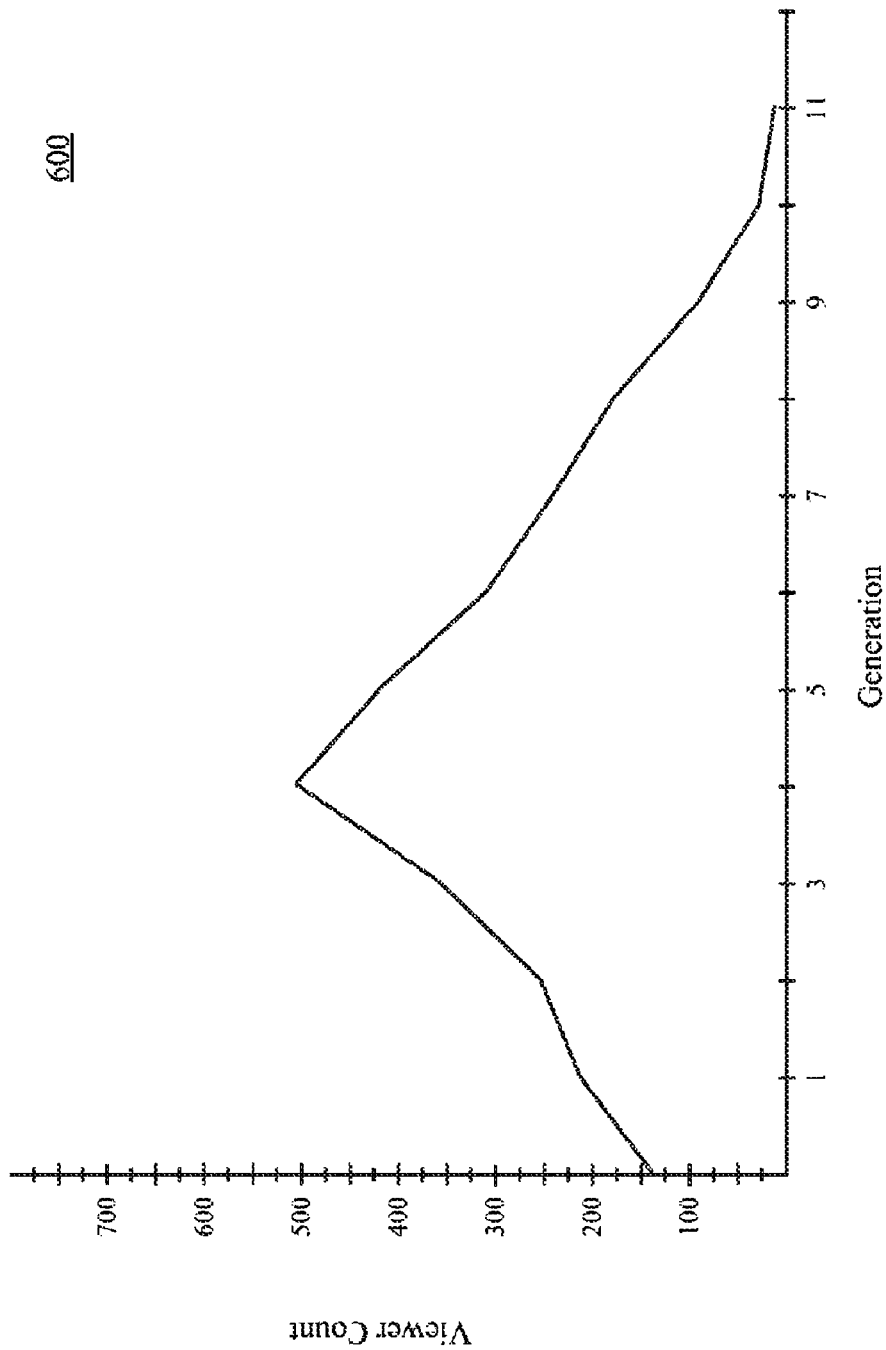
FIG. 6 includes a chart depicting viewer count across multiple generations for a single piece of media content according to various embodiments.

FIG. 6 includes a chart 600 depicting viewer count across multiple generations for a single piece of media content according to various embodiments. Using the generation codes and generation values, an analytics engine or computing system can generate a chart 600 that visually summarizes virality, social lift, or analytical results for one or more pieces of media content. Chart 600 allows total viewer count to be visually tracked by illustrating increases and decreases in viewership over the viral lifespan of a piece of media content. While FIG. 6 presents these measurements as a line chart, other chart types can also be used such as bar charts, histograms, pie charts, doughnut charts, bubble charts, heat maps, etc. The virality measurements can also be provided in other formats (e.g., tables).

In some embodiments, the chart 600 is presented to an administrator or a user by a graphical user interface (GUI). The GUI and analytics engine can be part of the same computing system or distinct computing systems. For example, analytics engine may be part of a first computing device and the GUI may be part of a second computing device. In such embodiments, the analytics engine can generate analytical results, such as virality measurements, chart(s), etc., and transmit the analytical results to the second computing device over a network. As another example, both the analytics engine and the GUI may be part of the same computing device. The computing devices may be a server, a personal computer, a tablet, a laptop computer, a personal digital assistant (PDA), a cellular telephone, a smartphone, etc.

Figure 7:
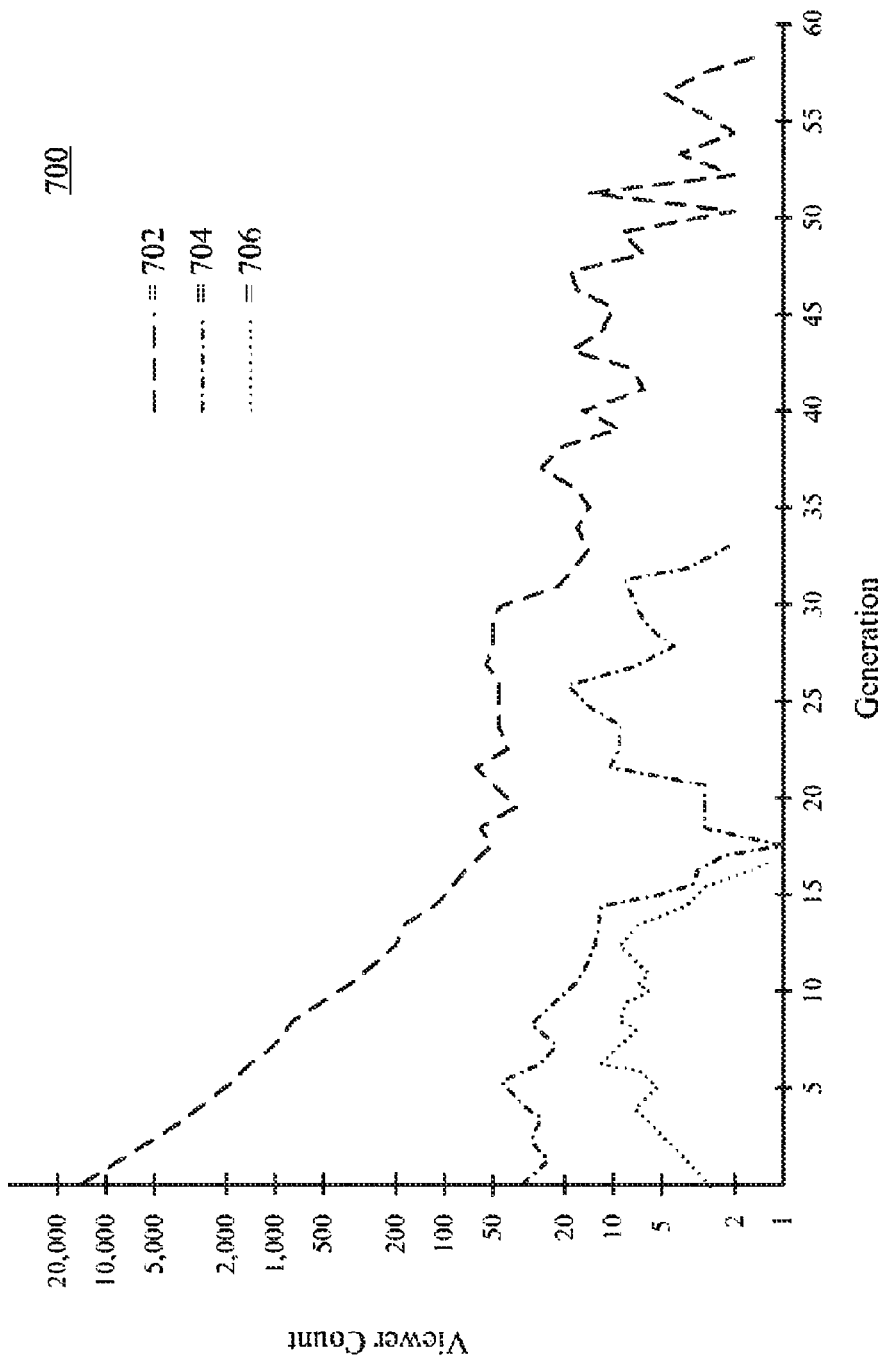
FIG. 7 includes a chart that compares viewer count for multiple pieces of media content across generations as may occur in some embodiments.

FIG. 7 includes a chart 700 that compares viewer count for multiple pieces of media content 702, 704, 706 across generations as may occur in some embodiments. Each piece of media content, which may be a story, quiz, image, video, etc., has a different viral lifespan and peak viewership. For example, some pieces of media content (e.g., piece of media content 702) have longer viral lifespans, which means they are shared across a substantial number of generations, while other pieces of media content (e.g., piece of media content 706) have relatively short viral lifespans.

Media content can also experience various levels and periods of popularity. For example, Gen_0 viewers represent the largest segment of viewers for piece of media content 702. This may occur if the piece of media content 702 is the subject of an advertising campaign (i.e., many viewers are targeted directly). The number of viewers may decrease in subsequent generations if viewers in earlier generations (e.g., Gen_0, Gen_1, Gen_2) elect not to share the content or if potential viewers elect not to follow URLs and links that have been shared. As another example, piece of media content 704 experiences a revival in viewership beginning at Gen_17. The revival could be due, at least in part, to a single Gen_17 user that widely shares the piece of media content or a higher conversion rate (i.e., high proportion of "shares" converted into viewers).

Figure 8:
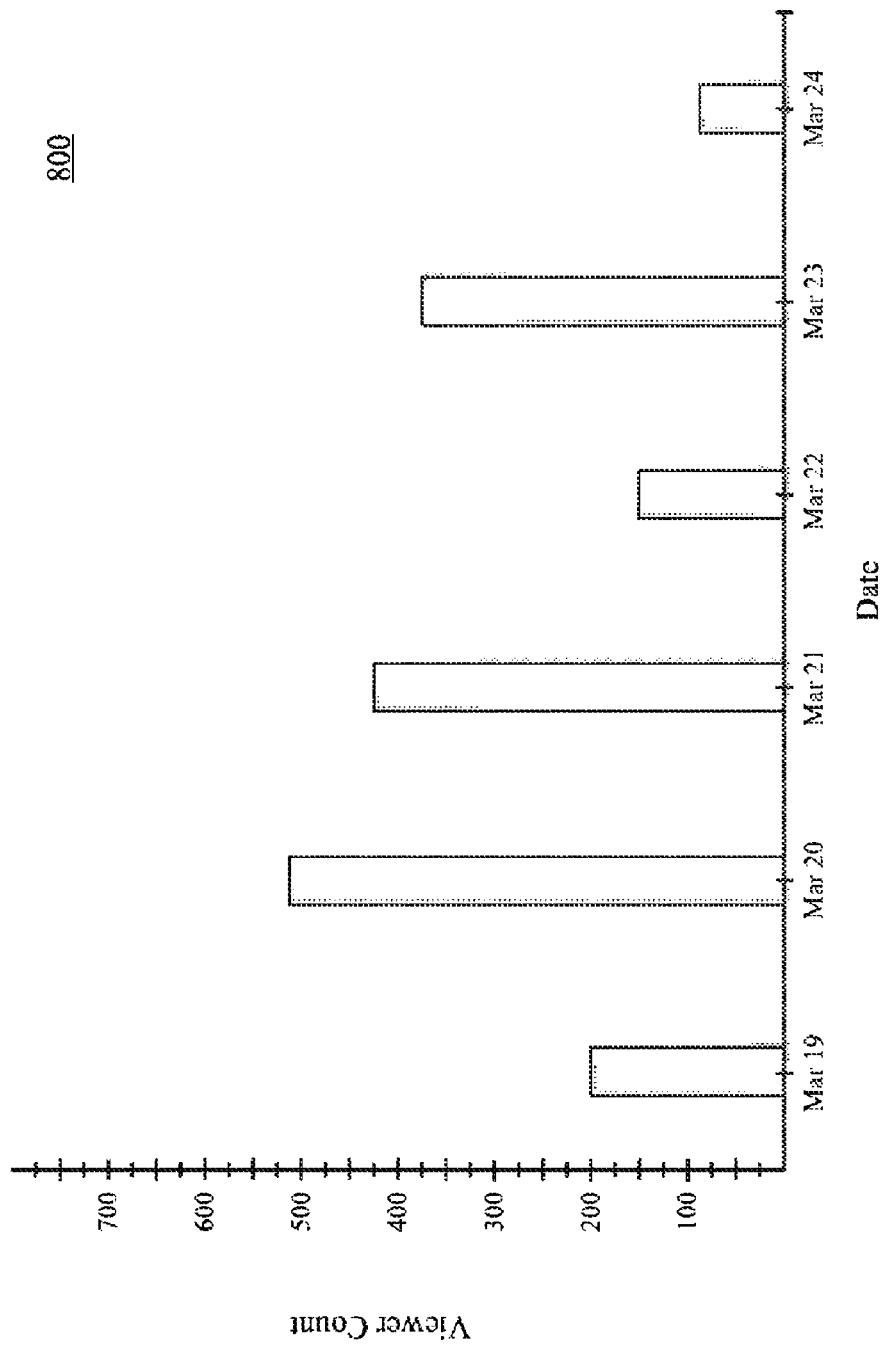
FIG. 8 includes a chart depicting viewer count for a piece of media content by the sharing date of Gen_0 viewers as may occur in some embodiments.

FIG. 8 includes a chart 800 depicting viewer count for a piece of media content by the sharing date of Gen_0 viewers as may occur in some embodiments. The chart 800 can be generated by an analytics engine (e.g., analytics engine 302 of FIG. 3) or computing system that generates time codes and analyzes their values. Charts can also be generated by the analytics engine that depict the number of next-generation viewers generated, profit generated, etc., for each subset of viewers associated with a date or time period. For example, total profit generated can be plotted against sharing date.

Figure 9:
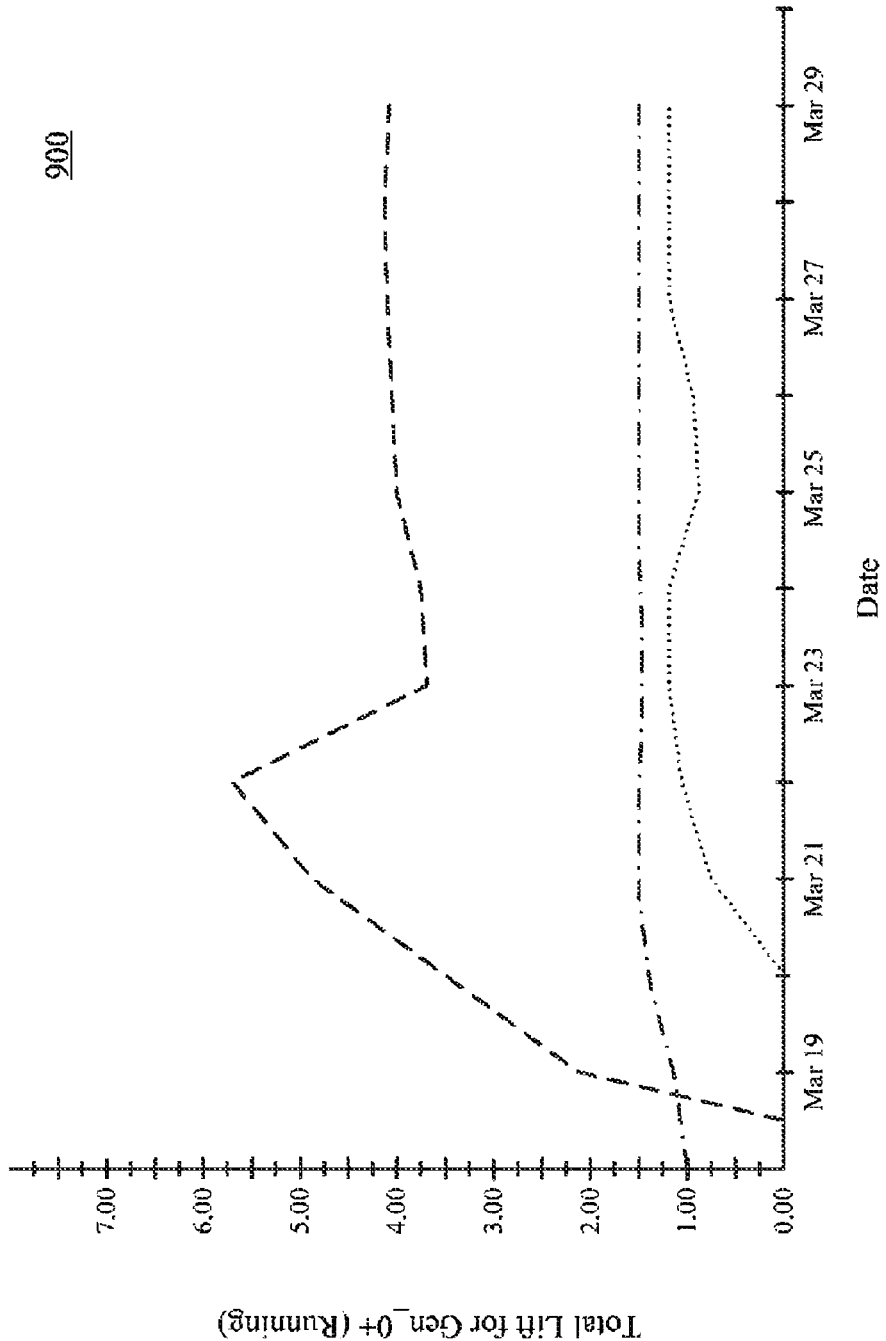
FIGS. 9-11 are charts as may be generated in accordance with various embodiments.
Figure 10:
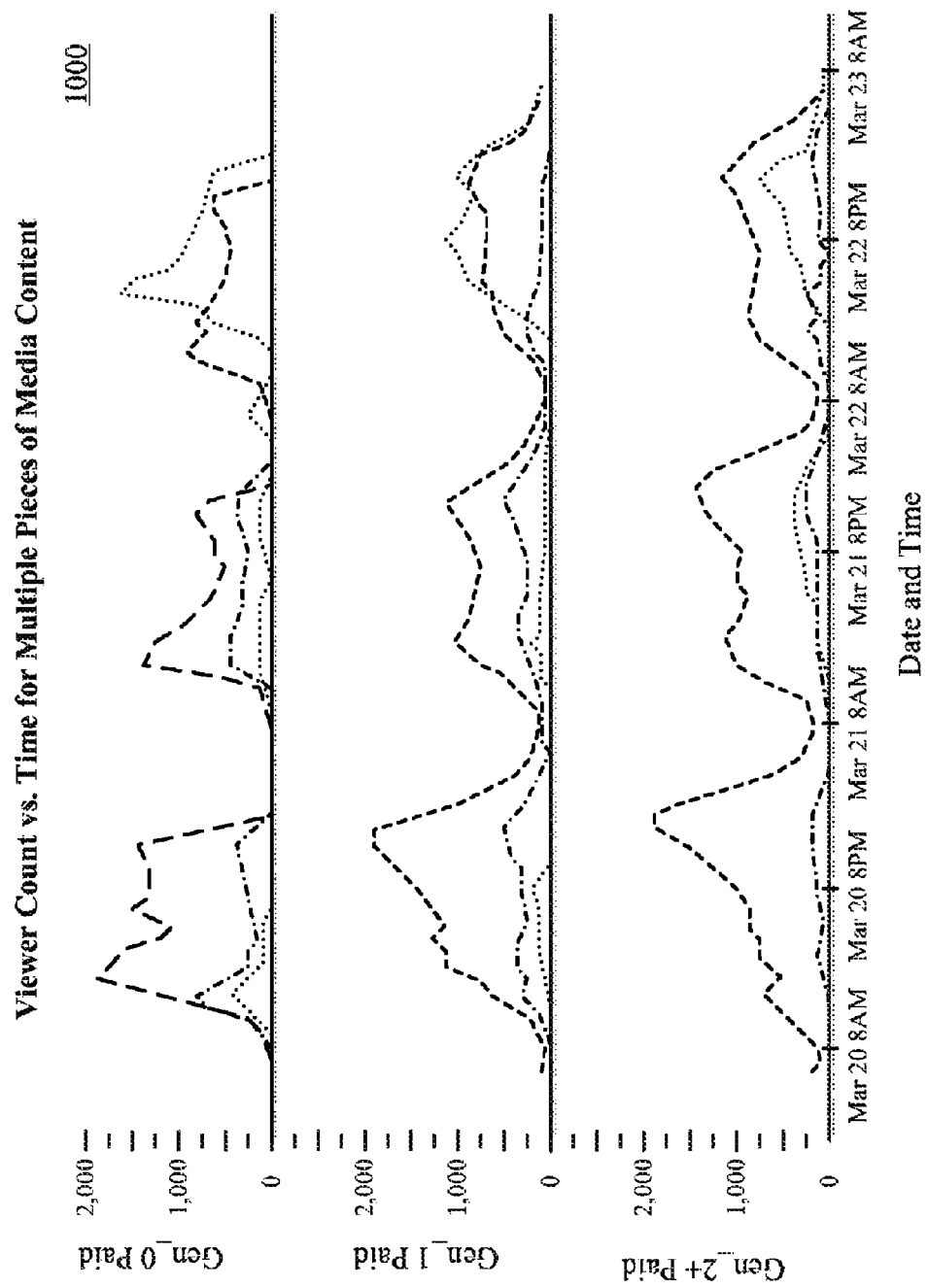
Figure 11:
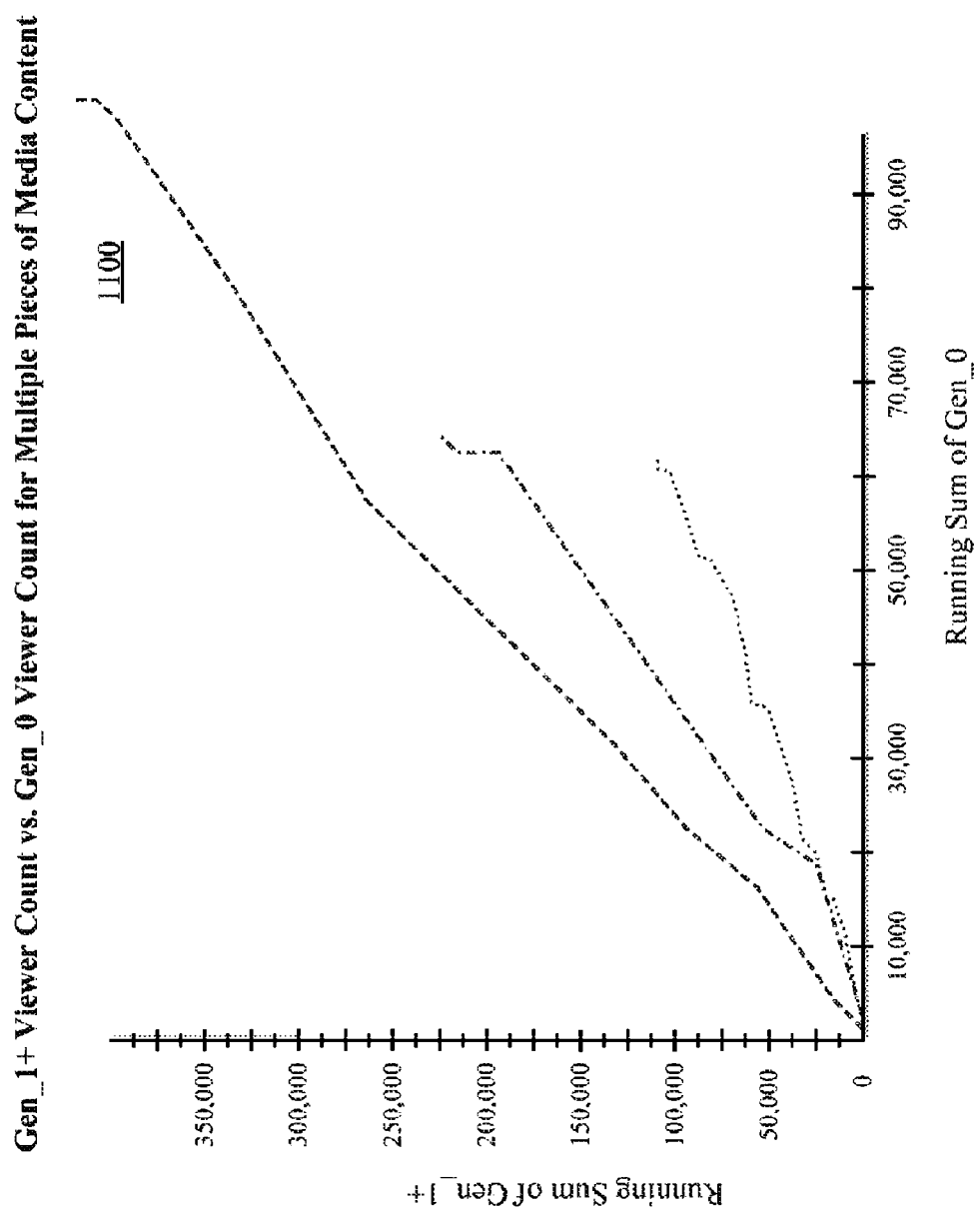

FIGS. 9-11 are charts 900, 1000, 1100 as may be generated in accordance with various embodiments. As described above, the charts can be presented to an interested party, such as an administrator, user, or client, through a GUI. In some embodiments, the GUI allows the interested party to modify the analytic and statistical measurements presented by selecting one or more pieces of media content, the time range over which analytics are applied, the statistical measurements and/or charts to be displayed, etc. The GUI can include both textual and graphical features. For example, a GUI may be configured to present results of statistical analyses in both a table and a chart.

Chart 900 of FIG. 9 compares the total lift of various pieces of media content. Total lift or social lift represents the increase or decrease in total views compared to the previous date or generation. For example, a total lift value of 0.50 represents a 50% increase in the total number of viewers. A running determination of total lift can be determined for any subset of viewers. FIG. 9, for example, includes all viewers (i.e., Gen_0+), but could include a more limited subset of viewers (e.g., Gen_1+ if directly targeted viewers are to be eliminated).

Chart 1000 of FIG. 10 illustrates the total viewer count over a three-day time period for various pieces of media content. The chart 1000 can be generated by an analytics engine that is able to create both generation codes and time codes. Similar charts can be created by analytics engines that generate either of these codes. In some embodiments, multiple viewing generations of a single piece of media content are tracked across a time range. For example, chart 1000 may indicate some pieces of media content are more popular at certain times, such as early afternoon or late evening. Viewing trends can also be compared for multiple pieces of media content at the same time, as shown in FIG. 10. More specifically, chart 1000 can be used to compare trends in overall viewership, generation viewer count, sharing, time/date viewing, etc., for multiple pieces of media content simultaneously. In some embodiments, two or more generations may be shown on the same axes (e.g., Gen_0 Paid and Gen_1 Paid overlaid on the same graph).

Chart 1100 of FIG. 11 depicts a running sum of Gen_1+ viewers (i.e., those viewers in generation one and all subsequent generations) against Gen_0 viewers. The slope of each curve represents the relative increase of viewers that are gathered socially (e.g., by sharing links) versus those viewers that are organic or have been successfully targeted by an advertisement. The slope, particularly when the running sum of Gen_0 is relatively low, may be useful in determining what media content is likely to become viral.

Comparisons that involve later generations (e.g., Gen_4+, Gen_6+) can be useful in determining true (i.e., unbiased) virality because these viewers are further removed from direct targeting. However, important viewing characteristics and financial measurements can come from comparing Gen_0 and Gen_1 viewers to other generations. For example, the measurements may indicate how media content is likely to propagate once outside of the base of loyal followers and/or advertising base.

The various charts described above are useful in identifying popular media content and successful advertising campaigns as quickly as possible. Identification of important trends and patterns will typically be based on historical trends of successful media content, although the systems and methods described herein can be used to do this more effectively and efficiently.

Figure 12:
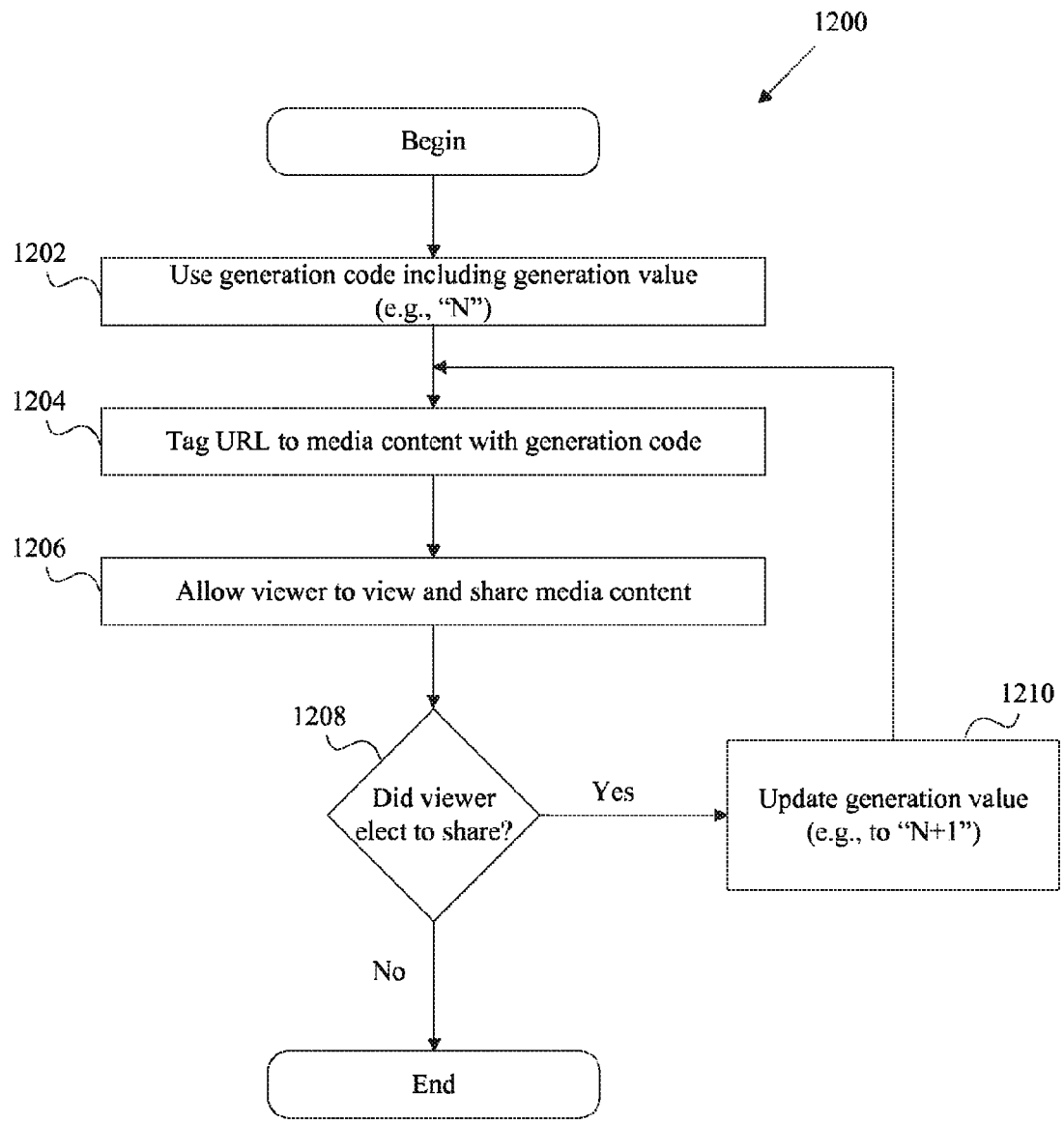
FIG. 12 is a flow diagram depicting general steps in a process for tracking virality as may occur in some embodiments.

FIG. 12 is a flow diagram depicting general steps in a process 1200 for tracking virality as may occur in some embodiments. The process 1200 can be used by an analytics engine or computing system to create generation codes that allow viewing trends and sharing trends to be tracked across generations of viewers. At block 1202, a generation code can be created and/or used that includes an initial generation value. The initial generation value may, for example, be an integer value "N." In some embodiments, the generation value represents the number of times that a piece of media content has been shared prior to being shared with the current viewer. Consequently, the initial generation value may be zero.

At block 1204, a URL to a piece of media content can be tagged with the generation code. For example, a URL to a piece of media content (e.g., a quiz) may be tagged with utm_user_gen=0. A viewer can select the URL or a link targeted to the URL to view the media content. If a viewer is directly targeted by an advertisement or accesses the URL organically (e.g., by browsing a content website), the viewer will be characterized as Gen_0. That is, the generation value of the URL is set to the initial value (e.g., N=0). At block 1206, the viewer is able to view and share the media content with other potential viewers. The viewer may share the media content by emailing, texting, or sharing (e.g., via social media platforms such as Facebook® and Twitter®) the URL.

At block 1208, the analytics engine or computing system can determine whether the viewer elected to share the media content. If the viewer does not elect to share, no action is taken. However, if the viewer does elect to share, the generation value is updated, as shown at block 1210. For example, the initial generation of "N" can be updated to "N+1." Each time the URL is subsequently shared, the generation value is updated. The process 1200 can continue so long as the URL to the piece of media content continues to be shared by subsequent viewers.

Figure 13:
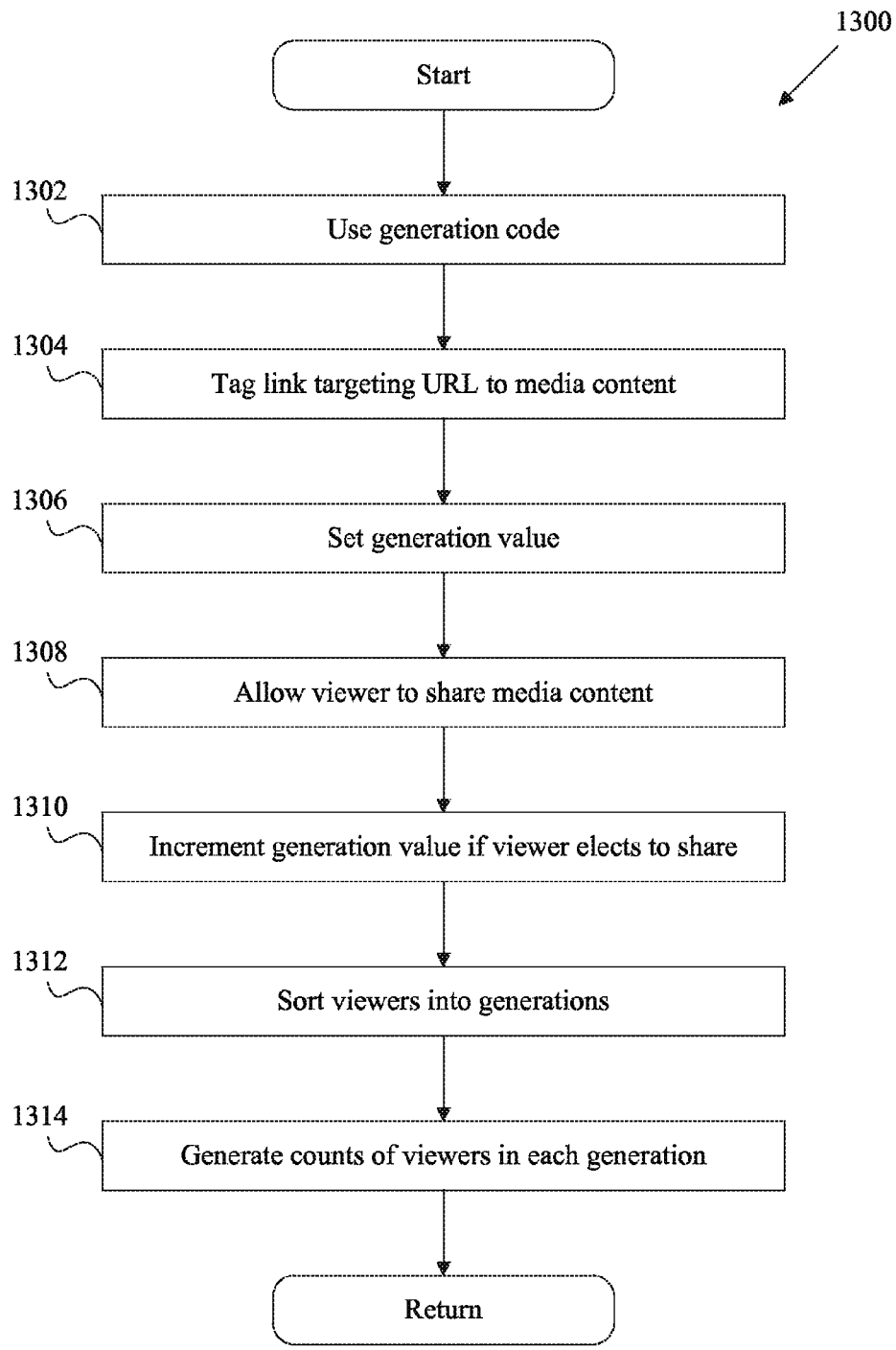
FIG. 13 is a flow diagram depicting general steps in a process for measuring virality and more accurately determining social lift as may occur in some embodiments.

FIG. 13 is a flow diagram depicting general steps in a process 1300 for measuring virality and more accurately determining social lift as may occur in some embodiments. At block 1302, an analytics engine can use a generation code that includes a generation value. At block 1304, the analytics engine can tag or append a URL or a link targeting the URL to a particular piece of media content with the generation code. The URL, which includes the generation code and the generation value, allows viewer characteristics to be tracked and analyzed. At block 1306, the generation value can be set. For example, if potential viewers are directly targeted by an advertisement directed toward the URL, the generation value may be zero. At block 1308, the viewer can be allowed to share the piece of media content with other viewers. As described above, the viewer may elect to share the media content through Twitter®, Facebook®, Instagram®, LinkedIn®, or any other social media/networking platform.

At block 1310, the analytics platform can increment the generation value if the viewer elects to share the media content. The generation value may be an integer value that represents the number of number of times the media content has been shared within a chain of viewers. In such embodiments, if the media content has been shared twice, the ensuing URL includes a generation value of two. At block 1312, some or all of the viewers can be sorted into generations based on their generation values. At block 1314, counts can be generated of the viewers within each generation. The viewer counts are useful in determining virality and social lift, among other measurements that impact marketing and advertising decisions. In some embodiments, the counts are subject to statistical analysis, the results of which can be textual (e.g., tables) or graphical (e.g., charts) in nature.

One skilled in the art will recognize the example URLs, unique IDs, etc., described herein are intended to be illustrative only. Various naming, numbering, and coding conventions could be used. Moreover, a particular convention (e.g., a lookup database that employs randomly-generated unique IDs that mask a viewer's identity) may be preferred in some situations, but undesirable in others. The term "UTM codes," meanwhile, has been used throughout the specification to describe any parameters appended to a link. Other types of parameters and/or methods of appending the parameters could also be used, including, for example, parameters that are encoded and obfuscated within the URL.

Figure 14:
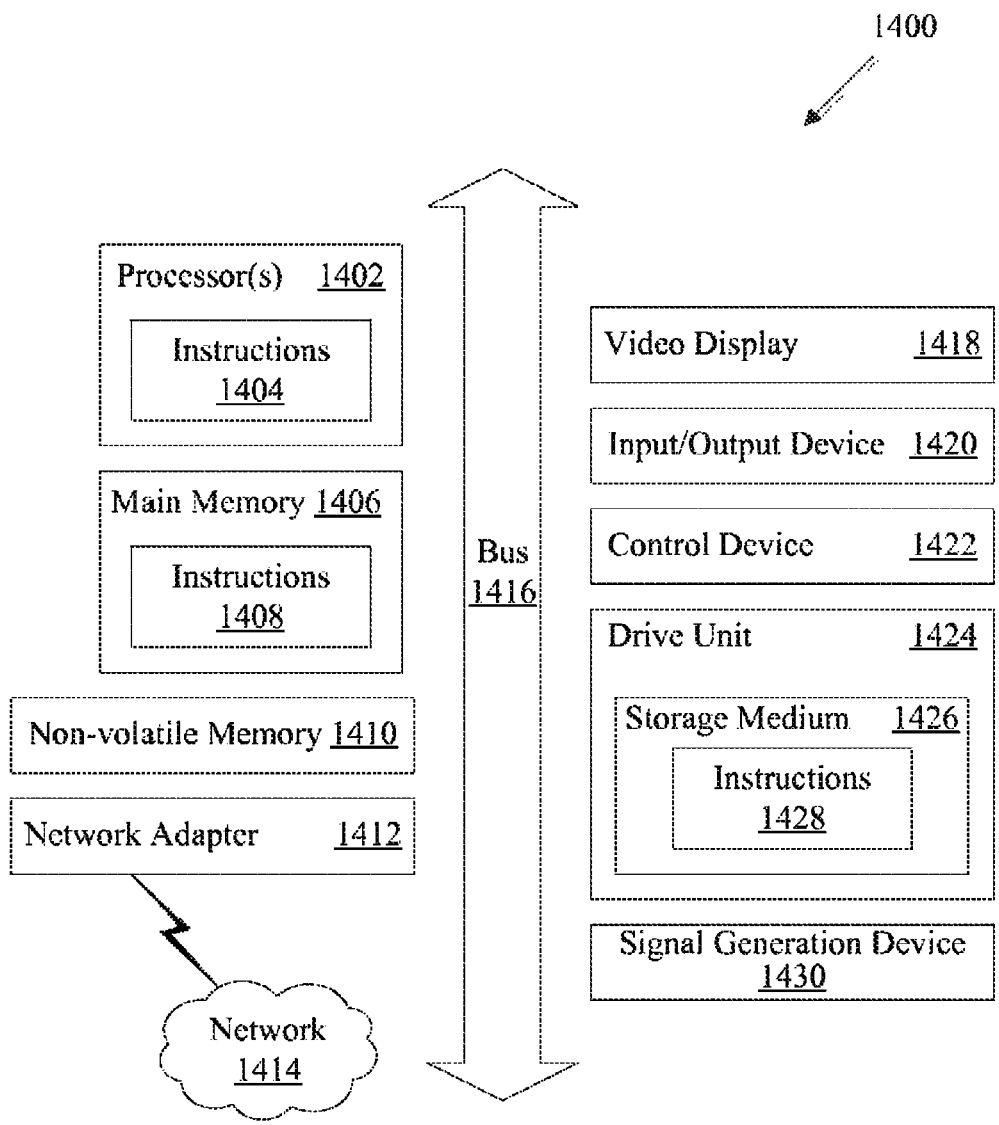
FIG. 14 is a block diagram illustrating an example of a computing system in which at least some operations described herein can be implemented.

FIG. 14 is a block diagram illustrating an example of a computing system 1400 in which at least some operations described herein can be implemented. The computing system may include one or more central processing units ("processors") 1402, main memory 1406, non-volatile memory 1410, network adapter 1412 (e.g., network interfaces), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents any one or more separate physical buses, point to point connections, or both connected by appropriate bridges, adapters, or controllers. The bus 1416, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 1400 operates as a standalone device, although the computing system 1400 may be connected (e.g., wired or wirelessly) to other machines. In a networked deployment, the computing system 1400 may operate in the capacity of a server or a client machine in a client-server network environment, or as a peer machine in a peer-to-peer (or distributed) network environment.

The computing system 1400 may be a server computer, a client computer, a personal computer, a user device, a tablet, a laptop computer, a PDA, a cellular telephone, an iPhone, an iPad, a Blackberry, a processor, a telephone, a web appliance, a network router, switch or bridge, a console, a hand-held console, any portable/mobile hand-held device, or any machine capable of executing a set of instructions (sequential or otherwise) that specify actions to be taken by the computing system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1404, 1408, 1428) set at various times in various memory and storage devices in a computer, and that, when read and executed by one or more processing units or processors 1402, cause the computing system 1400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1410, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 1412 enables the computing system 1400 to mediate data in a network 1414 with an entity that is external to the computing device 1400, through any known and/or convenient communications protocol supported by the computing system 1400 and the external entity.

The network adapter 1412 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1412 can include a firewall that can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A computer-implemented method for tracking virality of media content, the method comprising:
    creating a generation tracking code that allows viewership of a piece of media content to be sorted into generations,
        wherein the generation tracking code includes a generation value that specifies how many times the piece of media content has been shared before being viewed;
    appending the generation tracking code to a Uniform Resource Locator (URL) embedded within a link to the piece of media content;
    setting the generation value to an initial value;
    allowing a viewer to view the piece of media content by selecting the link;
    enabling the viewer to share the piece of media content by transmitting the link to a potential viewer;
    responsive to a determination that the viewer has elected to share the piece of media content,
        updating the generation tracking code by incrementing the generation value; and
    sorting all viewers of the piece of media content into generations based on the generation value in the link used by each viewer to access the piece of media content.

2. The method of claim 1, wherein the generations represent a viral lifespan of the piece of media content.

3. The method of claim 1, wherein the initial value is zero if the viewer is targeted directly by a creator of media content or a host of media content.

4. The method of claim 1, further comprising:
    appending one or more Urchin Traffic Monitor (UTM) codes to the URL embedded within the link to the piece of media content.

5. The method of claim 4, further comprising:
    attributing each viewer to a source and a previous generation using the generation tracking code and the one or more UTM codes appended to the URL.

6. The method of claim 1, further comprising:
    generating a count of viewers in each of the generations; and
    determining viral lift of the piece of media content by identifying changes in the counts across successive generations.

7. The method of claim 1, further comprising:
    generating a count of viewers in each of the generations; and
    constructing a visual representation of count against generation that illustrates viral lift of the piece of media content.

8. The method of claim 7, wherein the visual representation is a line graph.

9. A system for tracking virality of media content, the system comprising:
    a storage medium that includes a piece of media content; and
    a computer processor, communicatively coupled to the storage medium, configured to:
        create a generation tracking code that includes a generation value of "N,"
            wherein "N" is an integer value that represents how many times the piece of media content has been shared before being viewed;
        append the generation tracking code to a Uniform Resource Locator (URL) embedded within a link to the piece of media content;
        allow a viewer to view the piece of media content by selecting the link;
        enable the viewer to share the piece of media content by transmitting the link to a potential viewer; and
        responsive to a determination that the viewer has elected to share the piece of media content,
            produce an updated link having an updated generation tracking code that includes an updated generation value of "N+1".

10. The system of claim 9, wherein the computer processor is further configured to:
    create a plurality of generations, wherein each of the plurality of generations corresponds to a particular generation value.

11. The system of claim 10, wherein the computer processor is further configured to:
    generate a count of viewers in each of the plurality of generations.

12. The system of claim 9, wherein "N" is zero if the viewer is directly targeted by an advertising campaign.

13. The system of claim 12, wherein the computer processor is further configured to:
    generate a chart that visually represents virality of the piece of media content.

14. The system of claim 13, wherein the chart visually compares the virality of the piece of media content to virality of at least one other piece of media content.

15. The system of claim 9, wherein the piece of media content is a quiz.

16. A computer-implemented method for tracking virality of media content, the method comprising:
    identifying a piece of media content whose virality is to be tracked;
    creating a first generation tracking code that includes a first generation value of "N,"
        wherein "N" is an integer value that represents how many times the piece of media content has been shared before being viewed;
    embedding the first generation tracking code within tagging a first link to the piece of media content;
    allowing a viewer to view the piece of media content by selecting the first link;
    enabling the viewer to share the piece of media content with a potential viewer;
    responsive to a determination that the viewer has elected to share the piece of media content,
        creating a second generation tracking code that includes a second generation value of "N+1";

embedding the second generation tracking code within a second link to the piece of media content.

17. The method of claim 16, wherein the first generation tracking code is represented by a first unique identifier in a first uniform resource locator (URL) targeted by the first link, and the second generation tracking code is represented by a second unique identifier in a second URL targeted by the second link.

18. The method of claim 17, wherein the first unique identifier and the second unique identifier correspond to storage locations in a lookup database.

19. The method of claim 16, wherein the lookup database further includes at least one UTM code value for each of the first unique identifier and the second unique identifier.

* * * * *